United States Patent
Nishikawa et al.

(10) Patent No.: US 6,870,003 B2
(45) Date of Patent: Mar. 22, 2005

(54) PROCESS FOR PRODUCTION OF MODIFIED THERMOPLASTIC RESIN AND MODIFIED THERMOPLASTIC RESINS

(75) Inventors: Shigeo Nishikawa, Sodegaura (JP); Haruo Inoue, Sodegaura (JP); Naohiro Yamada, Sodegaura (JP)

(73) Assignee: Mitsui Chemical, Inc., Tokyo (JP)

( * ) Notice: Subject to any disclaimer, the term of this patent is extended or adjusted under 35 U.S.C. 154(b) by 175 days.

(21) Appl. No.: 10/257,056

(22) PCT Filed: Feb. 25, 2002

(86) PCT No.: PCT/JP02/01642

§ 371 (c)(1),
(2), (4) Date: Oct. 8, 2002

(87) PCT Pub. No.: WO02/068480

PCT Pub. Date: Sep. 6, 2002

(65) Prior Publication Data

US 2003/0060524 A1 Mar. 27, 2003

(30) Foreign Application Priority Data

Feb. 28, 2001 (JP) .......................................... 2001-54309

(51) Int. Cl.$^7$ .............................................. C08F 255/06
(52) U.S. Cl. ........................... 525/64; 525/69; 525/163; 525/263; 525/285; 521/79; 521/97
(58) Field of Search ............................ 525/64, 69, 163, 525/263, 285; 521/79, 97, 143

(56) References Cited

U.S. PATENT DOCUMENTS

| 5,725,987 A | * | 3/1998 | Combes et al. | ......... 430/137.11 |
| 5,902,858 A | * | 5/1999 | Okura et al. | ................ 525/263 |
| 6,114,076 A | * | 9/2000 | Odell et al. | ................. 525/444 |

FOREIGN PATENT DOCUMENTS

| EP | 0 506 041 A2 | 9/1992 |
| JP | 11-140223 A | 5/1999 |
| JP | 11-292981 A | 10/1999 |
| JP | 2000-53871 A | 2/2000 |
| JP | 2002-3529 A | 1/2002 |

* cited by examiner

Primary Examiner—Rabon Sergent
Assistant Examiner—Olga Asinovsky
(74) Attorney, Agent, or Firm—Birch, Stewart, Kolasch & Birch, LLP

(57) ABSTRACT

A process for producing modified thermoplastic resin by subjecting a thermoplastic resin to a modifying reaction in a molten state, comprising performing the modifying reaction using carbon dioxide as the reaction medium, wherein carbon dioxide is used in a proportion of 2–200 parts by weight per 100 parts by weight of the thermoplastic resin, whereby the efficiency and the uniformity of the reaction can be increased to a high extent while attaining considerable decrease in the remaining amount of the unreacted components in the resulting modified thermoplastic resin without having recourse to the use of an organic reaction solvent, so that the production can be realized easily at a low cost in an efficient manner.

4 Claims, 2 Drawing Sheets

PROCESS FOR PRODUCTION OF MODIFIED THERMOPLASTIC RESIN AND MODIFIED THERMOPLASTIC RESINS

This application is the national phase under 35 U.S.C. §371 of PCT International Application No. PCT/JP02/01642 which has an International filing date of Feb. 25, 2002, which designated the United States of America.

FIELD OF THE INVENTION

The present invention relates to a process for producing modified thermoplastic resin, by performing a reaction for modifying a thermoplastic resin in a molten state using carbon dioxide as the reaction medium, and to a modified thermoplastic resin obtained by such process and, in particular, to a process for producing modified thermoplastic resin, in which the modifying reaction can be attained in continuous way in extruding machine, and to a modified thermoplastic resin obtained thereby.

BACKGROUND OF THE INVENTION

It is well known to produce a modified thermoplastic resin by subjecting a thermoplastic resin to a modifying reaction in molten state in extruding machine. Hitherto, modifying reactions, such as grafting, cross-linking and so on, have been realized in industrial scale using such a technique as above. For instance, graft-modified polyolefin resins have found wide applications for those including modification of paints, adhesion onto polar substances and so on. In particular, modified polyolefin resins obtained by grafting an ethylenically unsaturated carboxylic acid or a derivative thereof onto polyolefin resins reveal superior modifying performance and, above all, modified polyolefin resins obtained by grafting maleic anhydride onto polyolefin resins have found wide applications for adhesive resins exhibiting favorable properties for, for example, packaging of foods etc.

However, conventional processes for producing modified thermoplastic resins by effecting the reaction for modifying thermoplastic resins in molten state result in lower efficiency and insufficient uniformity of the reaction, in addition to a problem of greater trend of the unreacted components to remain in the resulting modified thermoplastic resin.

On the other hand, so-called solution process has also been practically used as a technique better in the efficiency and uniformity of the reaction, in which an organic solvent is used as the reaction medium. However, this technique is difficult to apply for a continuous production on an extruding machine and has lower productivity due to inevitable use of batchwise production process, in addition to the problem of higher production costs due to the employment of expensive organic solvent which require bothersome handling measures.

An object of the present invention is to provide a process for producing modified thermoplastic resin, in which the efficiency and the uniformity of the modifying reaction can considerably be increased without having recourse to the use of organic solvent as the reaction medium and, in addition, the remainder of the unreacted components remaining in the resulting modified thermoplastic resin can be decreased to a marked extent and the modified thermoplastic resin can be produced easily at a lower cost in an efficient manner.

Another object of the present invention is to provide a modified thermoplastic resin obtained by such process.

DISCLOSURE OF THE INVENTION

The present invention consists in the following process for producing a modified thermoplastic resin and modified thermoplastic resin:

(1) A process for producing modified thermoplastic resin by subjecting a thermoplastic resin to a modifying reaction in a molten state, comprising
performing the modifying reaction using carbon dioxide as the reaction medium, wherein carbon dioxide is used in a proportion of 2–200 parts by weight per 100 parts by weight of the thermoplastic resin.

(2) A process for producing modified thermoplastic resin by subjecting a thermoplastic resin to a modifying reaction in a molten state, comprising
performing the modifying reaction using carbon dioxide as the reaction medium, wherein carbon dioxide is used in a proportion of 2–200 parts by weight per 100 parts by weight of the thermoplastic resin under addition of a radical initiator in an amount of 0.01 to 3 parts by weight.

(3) A process for producing modified thermoplastic resin by subjecting a thermoplastic resin to a modifying reaction in a molten state, comprising
performing the modifying reaction using carbon dioxide as the reaction medium, wherein carbon dioxide is used in a proportion of 2–200 parts by weight per 100 parts by weight of the thermoplastic resin under addition of a radical initiator in an amount of 0.01 to 3 parts by weight and an unsaturated carboxylic acid or a derivative thereof in an amount of 0.1 to 20 parts by weight.

(4) The process as defined in the above (3), wherein the modifying reaction is a grafting of the unsaturated carboxylic acid or the derivative thereof onto the thermoplastic resin.

(5) The process as defined in any one of the above (1) to (4), wherein the process comprises the process steps of
heating the thermopastic resin to melt,
introducing carbon dioxide into the molten resin under a pressure of 3–50 MPa,
performing the modifying reaction of the thermoplastic resin in the presence of carbon dioxide and
removing carbon dioxide and the concomitant impurities by extraction and degasification.

(6) The process as defined in any one of the above (1) to (5), wherein the modifying reaction is performed in an extruding machine.

(7) A modified thermoplastic resin obtained by the process as defined in any one of the above (1) to (6).

THE BEST MODE FOR EMBODYING THE INVENTION

Figure 1:
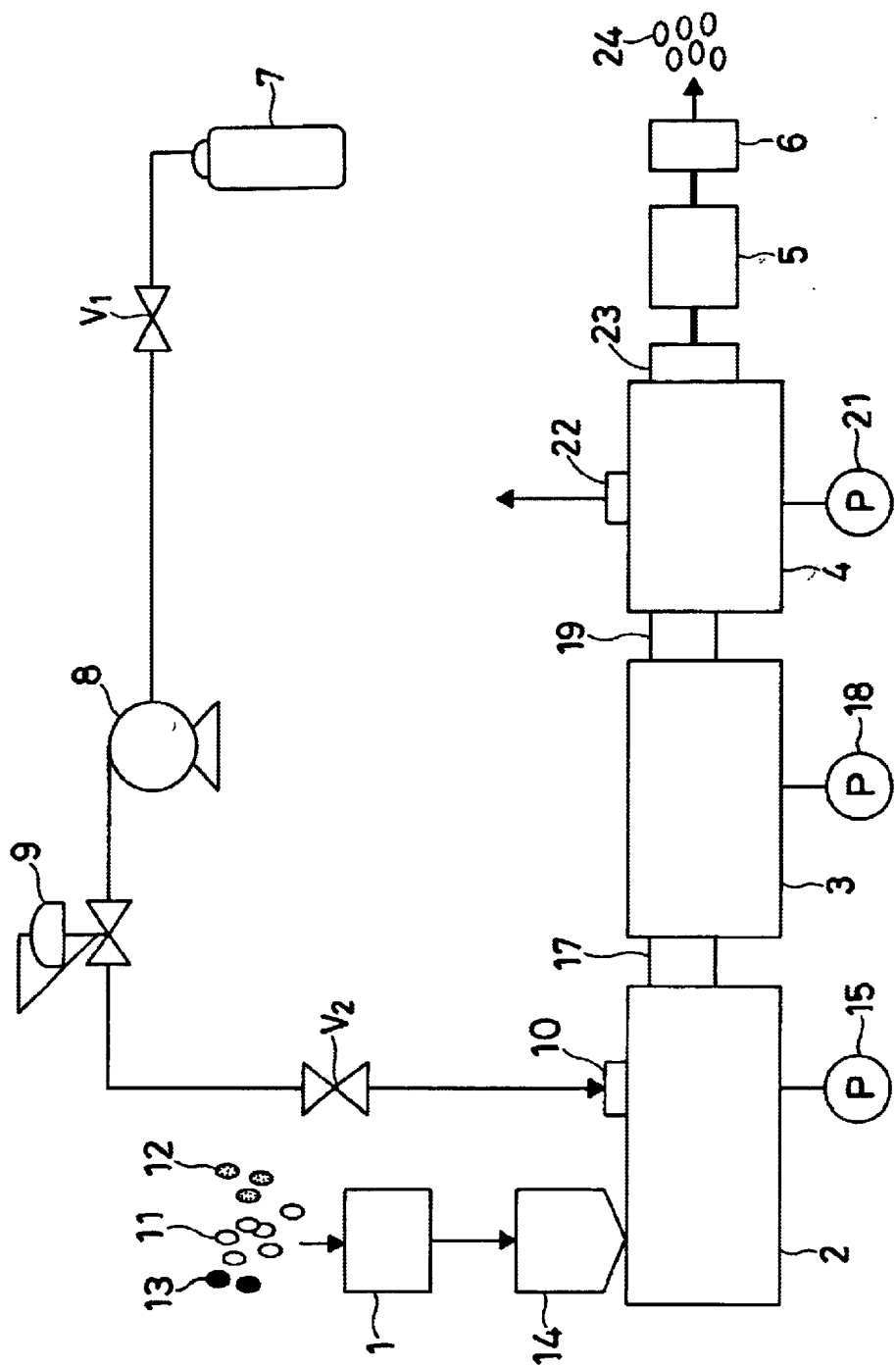
FIG. 1 shows a flow diagram of the process for producing modified thermoplastic resin according to the present invention using one embodiment of the apparatus for the production thereof.

The most important characteristic feature of the process for producing modified thermoplastic resin according to the present invention resides in that carbon dioxide is used as the reaction medium for the modifying reaction in an amount of 2–200 parts by weight, preferably 3–150 parts by weight, more preferably 5–100 parts by weight, per 100 parts by weight of the starting thermoplastic resin. By the use of carbon dioxide as the reaction medium in the amount as given above, a high functional modified thermoplastic resin can be obtained, while increasing the efficiency and the uniformity of the modifying reaction both to marked extents with simultaneous attainment of decrease in the remaining amount of unreacted components in the resulting modified thermoplastic resin at a greater ratio, whereby a modified thermoplastic resin of high quality having scarce content of remaining unreacted components can be produced. By the technique according to the present invention, a continuous and efficient production can be realized using an extruding machine at a low cost in a steady manner.

It is preferable to use carbon dioxide in a supercritical state in a form of a mixture with the starting thermoplastic resin, whereby a high quality modified thermoplastic resin having quite scarce content of impurities can be obtained.

While the reason why the efficiency and the uniformity of the modifying reaction are increased to considerable extent by the use of carbon dioxide as the reaction medium is not clear, it is assumed that the opportunity of contact of the thermoplastic resin molecules with the modifying reactants, such as a radical initiator and so on, will be made equal and be increased considerably by a prompt diffusion of carbon dioxide molecules in the mass of the thermoplastic resin to dissolve therein in the manner just like the behavior in the solution in an organic solvent of the prior technique of so-called solution process.

Also the reason why the content of unreacted components in the resulting modified thermoplastic resin decreases considerably by the use of carbon dioxide as the reaction medium is not clear, but it is assumed that carbon dioxide dissolved in the resin mass will behave as an extracting agent for the molecules of impurities, whereby they are gathered and removed together by being entrained upon the removal (degassification step) of carbon dioxide from the resulting modified thermoplastic resin. It is also assumed that a modified thermoplastic resin of high quality having quite scarce content of impurities can be obtained when carbon dioxide is used in a supercritical state, since the effect of extractive removal would be more enhanced.

As the starting thermoplastic resin to be modified according to the present invention, every thermoplastic resin capable of being brought into molten state can be employed without any restriction. Thus, there may be recited, for example, polypropylene, polyethylene, ethylene/propylene copolymer, polybutene, ethylene/butene copolymer, propylene/butene copolymer, ethylene/methacrylic acid copolymer, ethylene/acrylic acid copolymer, ethylene/vinyl acetate copolymer, ethylene/ethyl acrylate copolymer, poly-4-methylpentene, ionomer resins (such as those of ethylene/methacrylic acid copolymer), resins based on styrene {such as polystyrene, butadiene/styrene copolymer (HIPS), acrylonitrile/styrene copolymer (AS) and acrylonitrile/butadiene/styrene copolymer (ABS)}, polyvinyl chloride, polyvinylidene chloride, polycarbonate, polyacetal, polyphenylene oxide, polyvinyl acetate, polyvinyl alcohol, polymethyl methacrylate, cellulose acetate, polyesters (such as polyethylene terephthalate and polybutylene terephthalate), biodegradable polymers (for example, condensation products of hydroxycarboxylic acids, such as polylactate and so on, and condensation products of diols with carboxylic acids, such as polybutylene succinate and so on), polyamide, polyimide, fluororesins, polysulfones, polyethersulfones, polyarylates, polyether ether ketone, liquid-crystalline polymers, thermoplastic polyurethanes and thermoplastic elastomers.

As the starting thermoplastic resin to be modified, resins based on polyolefin are preferred. The starting thermoplastic resin may be used either alone or in a combination of two or more kinds.

By the process according to the present invention, a modified thermoplastic resin is produced by performing the modifying reaction in the presence of a carbon dioxide reaction medium as given above. There is no special limitation in the modifying reaction and there may be recited therefor, for example, grafting, cross-linking, polymerization concrete examples include addition polymerization, ring-opening polymerization, poly-condensation, addition condensation and polyaddition), decomposition, transesterification and curing. Among these reactions, grafting, cross-linking and decomposition may particularly be recited, wherein special mention should be given to grafting. The practical procedures of the process according to the present invention using the modifying reaction may be the same as in a conventional technique, except that the reaction is performed in the presence of carbon dioxide as the reaction medium.

According to the present invention, the modifying reaction for producing modified thermoplastic resin may preferably be performed in the presence of an initiator. As the initiator for the modifying reaction according to the present invention, there is no special limitation and known initiators may be used, wherein favorable modifying reactions may be effected using a radical initiator. A radical initiator decomposes on action of heat to build up free radical which causes initiation of the modifying reaction. As the radical initiator, organic peroxides are used favorably. As the organic peroxide, those which have a decomposition temperature for attaining a half-value period of one minute in the range from 30 to 400° C., preferably from 50 to 300° C., are preferred. If the decomposition temperature is in the above range, the decomposing reaction of the initiator will start at an occasion at which the organic peroxide is dispersed sufficiently in the reaction mixture and enough reaction will be attained within the residence time in the extruding machine.

Concrete examples of the organic peroxide include 1,1,3,3-tetramethyl hydroperoxide, 2,5-dimethyl-di(tert-butylperoxy)hexyne-3, di-tert-butyl peroxide, diisopropyl-benzene hydroperoxide, tert-butylcumyl peroxide, $\alpha, \alpha'$-bis(tert-butylperoxy)diisopropyl-benzene, 2,5-dimethyl-2,5-di(tert-butylperoxy)hexane, dicumyl peroxide, di-tert-butyl diperoxyisophthalate, n-butyl-4,4-bis(tert-butylperoxy) valerate, tert-butyl peroxybenzoate, tert-butyl peroxyacetate, tert-butyl peroxylaurate, benzoyl peroxide, acetyl peroxide, 2,3-dimethyl-2,3-diphenylbutane, tert-butyl hydroperoxide and cumene hydroperoxide. The organic peroxides may be used either alone or in a combination of two or more kinds.

The amount of radical initiator to be added to the starting thermoplastic resin may be in a proportion in the range from 0.01 to 3 parts by weight, preferably from 0.05 to 1 part by weight, per 100 parts by weight of the starting thermoplastic resin. If the amount of the radical initiator used is in the above range, a modified thermoplastic resin which has scarce content of impurities, such as gelled product and so on, and is superior in the material properties, in the appearance and in others can be produced within a brief time in an efficient manner, by realizing the modifying reaction while suppressing superfluous reaction. It is also possible to realize the production in an extruding machine in a stable manner without occurrence of surging.

The process according to the present invention is adapted especially for producing a graft-modified thermoplastic resin by a process in which an unsaturated carboxylic acid or a derivative thereof is grafted onto the starting thermoplastic resin, whereby a modified thermoplastic resin can be obtained with a superior modifying performance. As the unsaturated carboxylic acid or the derivative thereof to be grafted onto the starting thermoplastic resin, those which have hitherto been used for the graft-modification of starting thermoplastic resin can be used without limitation.

Concrete examples of the unsaturated carboxylic acid or derivative thereof include acrylic acid, methacrylic acid, maleic acid, itaconic acid, citraconic acid, mesaconic acid, maleic anhydride, himic acid anhydride, 4-methylcyclohex4-en-1,2-dicarboxylic acid anhydride, bicyclo[2.2.2]oct-5-en2,3-dicarboxylic acid anhydride, 2,2,3,4,5,8,9,10-octa-hydronaphthalene-2,3-dicarboxylic acid anhydride, 2-oxa-1,3-diketospiro[4.4]non-7-en-bicyclo[2.2.1]hept-5-en-2,3-dicarboxylic acid anhydride, maleopimaric acid, tetrahydrophthalic anhydride, x-methyl-bicyclo[2.2.1]-hept-5-en-2,3-dicarboxylic acid anhydride, x-methyl-norborn-5-en-2,3-dicarboxylic acid anhydride and norborn-5-en-2,3-dicarboxylic acid anhydride. Among them, acid anhydrides are preferred, with special preference to maleic anhydride and himic acid anhydride. The unsaturated carboxylic acid or the derivative thereof may be used either alone or in a combination of two or more kinds.

The amount of the unsaturated carboxylic acid or the derivative thereof to be admixed to the starting thermoplastic resin may favorably be in the range from 0.1 to 20 parts by weight, preferably from 1 to 10 parts by weight, per 100 parts by weight of the starting thermoplastic resin. When the proportion of the unsaturated carboxylic acid or the derivative thereof to be added to the starting thermoplastic resin is in the above range, a modified thermoplastic resin with superior modification performance can be obtained.

It is permissible according to the present invention, that the modifying reaction can be performed by incorporating in the starting thermoplastic resin, if necessary, one or more additives, such as pigment, dyestuff, slipping agent, antioxidant, filler, plasticizer, stabilizer, fire retardant, antistatic agent, UV shielding agent, cross-linking agent, antiseptic, foaming agent, foam nucleating agent, shrinkage preventing agent and crystallization nucleating agent, within an extent not obstructing the purpose of the present invention.

According to the present invention, starting thermoplatic resin is subjected to a modifying reaction in a heated and molten state using carbon dioxide as the reaction medium to obtain modified thermoplastic resin. It is preferable to carry out the heating and melting of the thermoplastic resin and the modifying reaction thereof in an extruding machine, since thereby continuous production of the modified thermoplastic resin can be realized.

As a favorable embodiment of the process for producing modified thermoplastic resin, the following practice may be exemplified. First, the starting thermoplastic resin is supplied to an extruding machine, where it is heated and melted. Then, carbon dioxide is introduced into the molten resin mass in the extruding machine under a pressure of 3–50 MPa, preferably 10–30 MPa, whereupon the molten resin is subjected to the modifying reaction in the presence of carbon dioxide to produce the modified thermoplastic resin. Thereafter, carbon dioxide and concomitant impurities, such as the unreacted components etc., are extracted out by degasification. The modifying reaction may be realized in the same manner as in the conventional practice, except that carbon dioxide is used as the reaction medium.

There is no limitation as for the extruding machine and every known one used for processing plastic resins can be employed. Thus, there may be employed, for example, monoaxial extruder having single screw, biaxial extruder having two parallel screws, multiaxial extruders having three or more parallel screws, single extruding machine having one extruder, tandem extruding machine in which two extruders are combined in series and multistage extruding machine in which three or more extruders are combined in series. Above all, monoaxial extruding machines are favorable, among which multi-staged extruding machines having two or more extruders connected in series are preferred. It is more easy to maintain the molten resin under a high pressure for monoaxial extruding machine than biaxial extruding machine, since the molten resin in monoaxial extruding machine fills up the internal spaces of the extruding machine completely. For the process for producing modified thermoplastic resin according to the present invention, use of monoaxial extruding machine is more favorable, since a high pressure is required for dissolving and diffusing a large amount of carbon dioxide into the molten resin mass. For the extruding machine, those which are provided with a supply inlet for supplying carbon dioxide and a degasification port for removing carbon dioxide and impurities from the resulting modified resin are preferred.

There is no special restriction for the practical manner of supplying carbon dioxide to the extruding machine and known techniques may be employed therefor. There may be employed, for example, a technique in which carbon dioxide is supplied from a gas bomb via a pressure reducing valve to the extruding machine in gaseous state under control of the pressure at the supply inlet and a technique in which carbon dioxide is supplied from a bomb through a metering pump to the extruding machine in liquid state or in a supercritical state under control of the flow rate. Among the two, the latter, in which carbon dioxide is supplied in liquid form or in a supercritical state, is preferred.

There is no special restriction in the practice for admixing the radical initiator, the unsaturated carboxylic acid or the derivative thereof and additives to the starting thermoplastic resin, in the location of their addition and in the timing of their addition and known techniques may be employed therefor. There may be employed, for example, a method in which the starting thermoplastic resin, the radical initiator, unsaturated carboxylic acid or the derivative thereof and, if necessary, one or more additives are mixed preliminarily and the resulting mixture is supplied to the extruding machine, a method in which the starting thermoplastic resin is heated and melted in an extruding machine and the radical initiator, the unsaturated carboxylic acid or the derivative thereof and additives are supplied to the extruding machine at a portion downstream from the supply of the thermoplastic resin and a method in which the starting thermoplastic resin and a part of other components are mixed preliminarily and the resulting mixture is supplied to the extruding machine, whereupon the remaining part of said other components is supplemented to the extruding machine at a lower reach of the flow path.

In the case where the thermoplastic resin, the radical initiator, the unsaturated carboxylic acid or the derivative thereof and the additive(s) are mixed preliminarily, there is no special limitation as to the manner for performing the mixing and usually known techniques may be employed. There may be practised, for example, a technique in which the thermoplastic resin and other components are mixed uniformly in a mixer or other mixing device or a technique in which the so-prepared uniform mixture is then supplied to, for example, a monoaxial or multiaxial extruder, mixing roll, kneader or bravendor, exhibiting sufficient kneading ability, to knead and melt the mixture.

The modified thermoplastic resin produced by the process according to the present invention should, not specifically be restricted in the form of the product, in the type and manner of extrusion and in the configuration of the extruding die used. The modified thermoplastic resin may be in a form of, for example, pellet, powder, strand, filament, film, sheet, plate, square profil, pipe, tube, circular cylinder, elliptical cylinder, mesh, extruded foam, multilayer extruded product, deformed extruded product, inflation-extruded product and ram-extruded product.

By the process according to the present invention, the efficiency and uniformity of the modifying reaction can remarkably be increased due to the use of carbon dioxide as the reaction medium, without having recourse to the use of expensive organic solvent bothersome in handling as the reaction solvent. In addition, the content of impurities, such as the remaining unreacted components, in the resulting modified thermoplastic resin can be reduced to a considerable extent. Further, the modification reaction which has heretofore been able to attain only by a batch-wise process can now become possible to realized in a continuous way, so that the production cost can be reduced considerably.

As described above, it is now made possible according to the present invention to increase the efficiency and the uniformity of the modifying reaction without making use of an organic solvent as the reaction medium, to decrease the content of unreacted components in the resulting modified thermoplastic resin markedly and to attain an easy and efficient production of the modified thermoplastic resin at a low cost, since the process according to the present invention has the characteristic feature of using carbon dioxide as the reaction medium in an amount as indicated.

The modified thermoplastic resin according to the present invention, obtained by the process described above, is a high performance resin of high quality having scarce impurity content, since the modifying reaction is performed with highly increased efficiency and uniformity.

Below, the process for producing modified thermoplastic resin according to the present invention is described in detail with reference to the appended drawings.

Figure 2:
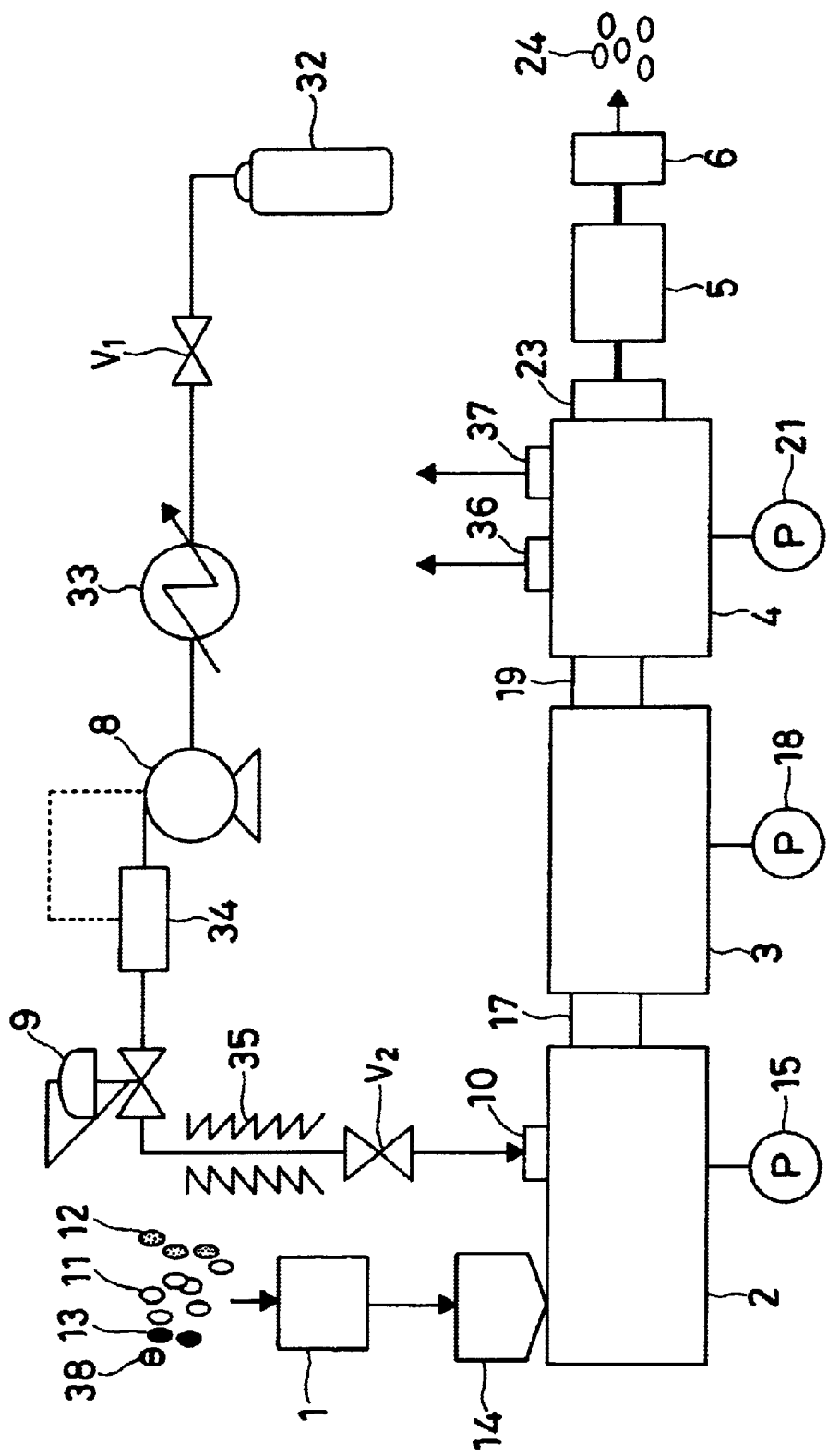
FIG. 2 shows a flow diagram of the process for producing modified thermoplastic resin according to the present invention using another embodiment of the apparatus for the production thereof.

FIG. 1 shows a flow diagram of the process for producing modified thermoplastic resin according to the present invention using one embodiment of the apparatus for the production thereof. FIG. 2 shows a flow diagram of the process according to the present invention using another embodiment of the apparatus.

In the flow diagram of FIG. 1, the apparatus comprises a mixer 1, the first extruder 2, the second extruder 3, the third extruder 4, a water tank 5, a chopper 6, a liquid carbon dioxide bomb 7, a metering pump 8 and a pressure control valve 9, wherein it is so constructed that the liquefied carbon dioxide in the bomb 7 can be supplied to the first extruder 2 through a carbon dioxide inlet 10.

For producing the modified thermoplastic resin using the apparatus of FIG. 1, the starting thermoplastic resin 11, an unsaturated carboxylic acid or derivative thereof 12 and a radical initiator 13 are mixed in the mixer 1 into a uniform starting mixture and this mixture is supplied, through a hopper 14, to the first extruder 2 where it is heated and kneaded into a molten mass.

On the other hand, the liquid carbon dioxide in the bomb 7 is guided in its liquid state as such to the metering pump 8 via a valve $V_1$, wherefrom the carbon dioxide is discharged under control of the pressure thereof through the pressure control valve 9 at a certain constant value between the critical pressure of carbon dioxide (7.4 MPa) and 50 MPa and is guided in liquid state or in a supercritical state into the first extruder 2 through a valve $V_2$ and via the carbon dioxide inlet 10. The rate of supply of carbon dioxide may be in the range from 2 to 200 parts by weight per 100 parts by weight of the starting thermoplastic resin. The supplied carbon dioxide is mixed with the molten resin mixture in the first extruder and is dissolved and dispersed therein.

In order to supply carbon dioxide under a pressure in the range from 3 to 50 MPa, the starting thermoplastic resin may preferably be supplied to the extruder also under a pressure in the range from 3 to 50 MPa. A supply pressure of the thermoplastic resin at a value of 3 MPa or higher is favorable in view of dissolution and dispersion of carbon dioxide in the molten resin mixture. A supply pressure of the thermoplastic resin at a value not exceeding 50 MPa is favorable in view of prevention of leakage of gases from the extruder.

The configuration of the screw of the first extruder 2 is not specifically restricted so long as the screw is adapted to cause the resin mixture to melt in the extruder before it reaches the carbon dioxide inlet 10. A screw provided at a portion before the carbon dioxide inlet 10 with a ring or a unimelt arranged to leave only a small clearance between it and the ballel is particularly preferred. On supplying carbon dioxide to the extruder, no back flow of carbon dioxide back towards the hopper 1 will occur due to the melt-sealing action of the molten resin mixture itself, so long as the supply rate of carbon dioxide is proper and the resin mixture is completely in molten state.

The molten thermoplastic resin mixture in which carbon dioxide has been dissolved and dispersed is guided to the second extruder 3 settled at a temperature adapted for the modifying reaction through a transfer line 17 to subject it to further kneading, in order to further proceed the modifying reaction. While the temperature and the pressure in the second extruder 3 may not specifically be settled due to variation in accordance with each specific thermoplastic resin, the kind and amount of the radical initiator used, supply rate of carbon dioxide, each specific modified thermoplastic resin aimed at, the apparatus employed and so on, it may be favorable to select the reaction temperature in the range from 50 to 300° C., preferably from 100 to 250° C., for producing a graft-modified thermoplastic resin by grafting an unsaturated carboxylic acid or a derivative thereof onto a starting thermoplastic resin.

The configuration of the screw in the second extruder 3 is not specifically restricted. The screw installed in the second extruder 3 may have a properly selected configuration, since optimum kneading condition may be different in accordance with each specific starting thermoplastic resin used, each specific condition of the reaction employed and so on. If higher pressure is required in the second extruder, use of a multiple flight type screw designed to have shallow grooves may be preferred. If a longer residence time is required, use of a multiple flight type screw having a flight of form of weir in the section may be preferable.

The modified thermoplastic resin composition obtained in the second extruder 3 (referred to in the following as the modified thermoplastic resin) is guided via a transfer line 19 to the third extruder 4. The third extruder 4 operates so as to remove carbon dioxide and impurities, such as unreacted components etc., from the modified thermoplastic resin by degasification. In the production apparatus, the upstream section down to the second extruder 3 is kept under higher pressure so as to keep carbon dioxide in a state of solution dissolved in the molten resin mixture. In order to remove the so-dissolved carbon dioxide from the resin mixture in the third extruder 4, the pressure of the molten modified thermoplastic resin in the third extruder 4 is relieved to a lower level than that in the second extruder 3. This pressure difference may adequately be selected in accordance with each specific apparatus employed, wherein a pressure difference of at least 3 MPa is especially favorable.

In the third extruder 4, removal of carbon dioxide and impurities, such as the unreacted reaction components etc., is realized in such a manner that the pressure is relieved therein while maintaining the kneading action, so as to separate carbon dioxide and concomitant impurities, such as the unreacted reaction components etc., in gaseous state from the molten resin to exhaust them out via a degasification port 22.

There is no special restriction in the configuration of the screw installed in the third extruder 4. The screw in the third extruder may have any pertinent form in accordance with each specific starting thermoplastic resin and with the modified thermoplastic resin obtained. In particular, it is preferable to use here a screw having greater groove depth, since the third extruder should operate so as to relieve the pressure.

The modified thermoplastic resin having deprived of carbon dioxide and the impurities, such as unreacted components etc., by degasification is then extruded through an extrusion die 23 arranged at the exit of the third extruder 4 into a form of strand. The so-extruded strand of the modified thermoplastic resin is passed through water layer in the water tank 5 to cool it and is then chopped by the chopper 6 into pellets 24.

While the process shown in FIG. 1 indicates removal of carbon dioxide before the modified resin is extruded through the die 23, it is possible that only a part of carbon dioxide is removed here and the modified resin containing the remaining carbon dioxide is extruded to form a foamed product utilizing the remaining carbon dioxide as the foaming agent.

It is also possible to arrange a plurality of carbon dioxide inlets 10, though FIG. 1 shows only one inlet 10. It is furthermore possible to use a single extruding machine having one extruder, a tandem extruding machine having two extruders connected in series or a multistaged extruding machine having four or more extruders connected in series, though FIG. 1 shows a multistaged extruding machine having three extruders connected in series.

By the process shown in FIG. 1, a product of the modified thermoplastic resin in a form of pellets can be produced using extruding machine continuously at a low cost in an efficient manner, since carbon dioxide is used as the reaction medium. It permits to produce a high functional product of modified thermoplastic resin, while increasing the efficiency and uniformity of the modifying reaction to considerable extent due to employment of the technique of subjecting a molten thermoplastic resin mixture in which carbon dioxide is dissolved and dispersed homogeneously to the modifying reaction. By employing a technical measure of removing carbon dioxide and concomitant impurities comprising unreacted components etc. from the molten resin mixture by extraction and degasification via an extruder through a degasification port 22, a high quality product of the modified thermoplastic resin having scarce impurity content can be obtained in a form of pellets 24, in which the content of remainder of unreacted components in the product is reduced to a marked extent.

The apparatus of FIG. 2 is constructed in such a manner that liquefied carbon dioxide can be taken out directly from the liquid phase in a liquid carbon dioxide bomb 23 in a manner similar to a siphon and be passed to a metering pump 8 in liquid state as such by cooling the flow path from the bomb 32 to the metering pump 8 using a coolant circulator 33. A mass flowmeter 34 is arranged so as to permit a direct assessment of the flow rate of the liquid carbon dioxide. A heating means 35 is arranged to permit to heat the line starting from the control valve 9 to the carbon dioxide inlet 10, in order to enable to supply carbon dioxide to the first extruder 2 in a supercritical state. A plurality of degasification ports (36, 37) are arranged. Other construction is the same as in the apparatus of FIG. 1.

By the apparatus of FIG. 2, modified thermo-plastic resin can be produced in the same way as in the apparatus of FIG. 1, except that the starting thermoplastic resin mixture is prepared with further addition of a stabilizer 38 and the resulting mixture is supplied to the first extruder 2, while supplying thereto, via the carbon dioxide inlet 10, carbon dioxide in a supercritical state established under heating by the heating means 35 to attain sufficient mixing with the moltem resin mixture and while removing carbon dioxide and concomitant impurities by extraction and degasification in the third extruder 4 through the plurality of degasification ports (36, 37).

In the following, the present invention will further be described in more detail by way of Examples and Comparative Examples.

EXAMPLE 1

A modified thermoplastic resin was produced using the apparatus as shown in FIG. 2. There were used a Henschel mixer for the mixer 1 and a multistaged extruding machine comprising a first extruder 2 having a screw with a screw diameter of 20 mm, a second extruder 3 having a screw with a screw diameter of 30 mm and a third extruder 4 for the extruding machine. The first extruder 2 is provided at its central portion with a carbon dioxide inlet 10 and the third extruder 4 is provided with two degasification ports 36 and 37.

The thermoplastic resin mixture to be subjected to the modification reaction was prepared, by mixing sufficiently on the mixer 1, 100 parts by weight of a homopolymer of propylene (a product of the firm Grandpolymer with trademark GRANDPOLYPRO J101 PT) as the starting thermoplastic resin 11, 3 parts by weight of a granular product of maleic anhydride (a product of Nippon Oil and Fats Co., Ltd. with trademark CRYSTALMAN AB) as the unsaturated carboxylic acid derivative 12, 0.7 part by weight of 2,5-dimethyl-di(tert-butylperoxy)hexyne-3 (a product of Nippon Oil And Fats Co., Ltd. with trademark PERHEXYN 25B, having a decomposition temperature of 194° C. for attaining a half-life of one minute) as the radical initiator 13 and 0.2 part by weight of tetrakis{methylene-3(3,5-di-tert-butyl-4-hydr-oxyphenyl)propionate}methane (a product of Ciba Geigy Ltd. with trademark IRGANOX 1010) as the stabilizer 38.

The resulting mixture was supplied to the first extruder 2 via a hopper 14 and was heated at 170° C. to melt. The apparatus is constructed in such a manner that carbon dioxide can be introduced into the resin mixture in liquid state directly from the liquid phase in the liquid carbon dioxide bomb 32 by the principle of siphon. Using the coolant circulator 33, the flow path from the bomb 32 to the metering pump 8 was cooled by an aqueous ethylene glycol of minus 12° C. so as to permit transference of carbon dioxide in liquid state to the metering pump 8. The operation of the metering pump 8 was controlled to pump the liquefied carbon dioxide at a rate of 0.2 kg/hour by direct adjustment using the mass flowmeter 34 and the delivery pressure of the pump was adjusted at 30 MPa using the control valve 9. The volumetric efficency of the metering pump 8 was found to be constant at a value of 65%.

Carbon dioxide was supplied to the first extruder 2, while maintaining the line starting from the control valve 9 to the carbon dioxide inlet 10 of the first extruder 2 at a temperature of 50° C. by heating the line with the heating means 35. The molten resin at the carbon dioxide inlet was kept here under a pressure of 15 MPa. Namely, the carbon dioxide directly before being introduced into the molten resin mixture was maintained at a temperature of 50° C. or higher and under a pressure of 15 MPa and was present in a supercritical state.

The supercritical carbon dioxide was supplied to the first extruder 2 at a rate of 20 parts by weight per 100 parts by weight of the molten thermoplastic resin mixture and was here subjected to the action of the screw so as to dissolve and disperse uniformly in the molten resin mixture. The resulting uniform molten mixture was guided to the second extruder 3, where the mixture was adjusted at a temperature of 190° C. under a pressure of 20 MPa to cause the modifying reaction of the thermoplastic resin 11. The molten resin mixture subjected to the modifying reaction in the second extruder 3 was then transferred to the third extruder 4, where the mixture was adjusted at a temperature of 170° C. under a pressure of 0.3 MPa. Carbon dioxide and the concomitant impurities, such as unreacted reaction components etc., were removed from the molten resin mixture by extraction and degasification under a reduced pressure through the two degasification ports 36 and 37.

The resulting molten modified thermoplastic resin deprived of carbon dioxide and the concomitant impurities was then extruded through an extrusion die 23 disposed at the exit of the third extruder 4 into strands at an extrusion rate of 1 kg/hour. The so-extruded strands of the modified thermoplatic resin were then cooled by passing through a water layer in the water tank 5 and were chopped by the chopper 6 to obtain a pelletized product 24 of the modified thermoplastic resin.

The amount of maleic anhydride grafted onto the starting thermoplastic resin was confirmed to be 1.22% by weight, based on the modified thermoplastic resin assumed to be 10% by weight. The intrinsic viscosity [η] of the modified thermoplastic resin was found to be 0.70 cm$^3$/g. The content of remaining unreacted maleic anhydride was determined to be 0.007 part by weight per 100 parts by weight of the modified thermoplastic resin.

COMPARATIVE EXAMPLE 1

The same procedures as in EXAMPLE 1 were pursued, except that the supply of carbon dioxide was omitted.

The amount of maleic anhydride grafted onto the thermoplastic resin was confirmed to be 0.70% by weight, based on the modified thermoplastic resin assumed to be 100% by weight. The intrinsic viscosity [η] of the modified thermoplastic resin was found to be 0.90 cm$^3$/g. The content of remaining unreacted maleic anhydride was determined to be 0.030 part by weight per 100 parts by weight of the modified thermoplastic resin.

COMPARATIVE EXAMPLE 2

The same procedures as in EXAMPLE 1 were pursued, except that supercritical carbon dioxide was supplied to the first extruder as in EXAMPLE 1 but at a rate of 1 part by weight per 100 parts by weight of the molten resin mixture.

The amount of maleic anhydride grafted onto the thermoplastic resin was confirmed to be 0.72% by weight, based on the modified thermoplastic resin assumed to be 100% by weight. The intrinsic viscosity [η] of the modified thermoplastic resin was found to be 0.89 cm$^3$/g. The content of remaining unreacted maleic anhydride was determined to be 0.028 part by weight per 100 parts by weight of the modified thermoplastic resin.

COMPARATIVE EXAMPLE 3

The same procedures as in EXAMPLE 1 were pursued, except that supercritical carbon dioxide was supplied to the first extruder as in EXAMPLE 1 but at a rate of 250 parts by weight per 100 parts by weight of the molten resin mixture.

During the production process, an intermittent leakage of carbon dioxide occurred at the grand packing constituting the gas sealing means of the second extruder 3, whereby a stable production of modified thermoplastic resin was not able to attain.

INDUSTRIAL APPLICABILITY

The process for producing modified thermoplastic resin according to the present invention using carbon dioxide as the reaction medium can attain a marked improvement in the efficiency and in the uniformity of the modifying reaction without having recourse to the use of organic solvent which is expensive and bothersome in handling as the reaction medium. The process according to the present invention can achieve a considerable decrease in the content of impurities, such as unreacted reaction components etc., in the resulting modified thermoplastic resin. Moreover, it provides for a marked reduction in the production cost, since it permits to realize in a continuous way, as contrasted to the prior technique which permits only a batchwise production.

What is claimed is:

1. A process for producing modified thermoplastic resin by subjecting a thermoplastic resin to a modifying reaction in a molten state, said process comprising the steps of:
   performing the modifying reaction using carbon dioxide as the reaction medium, wherein carbon dioxide is used in a proportion of 2–200 parts by weight per 100 parts by weight of the thermoplastic resin under addition of a radical initiator in an amount of 0.01 to 3 parts by weight and an unsaturated carboxylic acid or a derivative thereof in an amount of 0.1 to 20 parts by weight;
   heating the thermoplastic resin in an extruding machine to melt;
   introducing-carbon dioxide into the molten resin under a pressure of 3–50 MPa;
   performing the modifying reaction of the thermoplastic resin in the presence of carbon dioxide; and
   removing carbon dioxide and the concomitant impurities by extraction and degasification, before the modified resin is extruded through the extrusion die.

2. The process as claimed in claim 1, wherein the modifying reaction is a grafting of the unsaturated carboxylic acid or the derivative thereof onto the thermoplastic resin.

3. A modified thermoplastic resin obtained by the process as claimed in claim 1.

4. A process for producing modified thermoplastic resin by subjecting a thermoplastic resin to a modifying reaction in a molten state, said process comprising the steps of:
   heating the thermoplastic resin in an extruding machine to melt;
   introducing carbon dioxide into the molten resin under a pressure of 3–50 MPa;

performing the modifying reaction of the thermoplastic resin in the presence of carbon dioxide; and removing carbon dioxide and the concomitant impurities by extraction and degasification, before the modified resin is extruded through the extrusion die;

wherein the modifying reaction has carbon dioxide as the reaction medium and carbon dioxide is used in a proportion of 2–200 parts by weight per 100 parts by weight of the thermoplastic resin under addition of a radical initiator in an amount of 0.01 to 3 parts by weight and an unsaturated carboxylic acid or a derivative thereof in an amount of 0.1 to 20 parts by weight.

* * * * *